United States Patent [19]

Takahashi et al.

[11] 4,132,434
[45] Jan. 2, 1979

[54] VEHICLE SEAT AND SAFETY SEAT BELT ASSEMBLY

[75] Inventors: Fujio Takahashi; Harutoshi Tsujimura, both of Yokohama, Japan

[73] Assignees: Nissan Motor Company, Limited; Ikeda Bussan Company, Limited, both of Yokohama, Japan

[21] Appl. No.: 749,434

[22] Filed: Dec. 10, 1976

[30] Foreign Application Priority Data

Dec. 11, 1975 [JP] Japan .................. 50/166273[U]

[51] Int. Cl.² ........................................... B60R 21/10
[52] U.S. Cl. .................................... 280/744; 297/385
[58] Field of Search ............... 280/744, 745, 746, 747; 180/82 C; 297/387, 388, 385; 403/90, 122, 141

[56] References Cited

U.S. PATENT DOCUMENTS

| 2,089,463 | 8/1937 | Ritz-Woller | 403/90 X |
| 2,457,639 | 12/1948 | Brooks | 403/90 X |
| 3,230,009 | 1/1966 | Schmidt et al. | 297/388 |
| 3,295,862 | 1/1967 | Ebert | 280/744 |
| 3,318,634 | 5/1967 | Nicholas | 280/744 X |
| 3,572,832 | 3/1971 | Graham et al. | 297/388 |
| 3,823,978 | 7/1974 | Dove | 297/388 |
| 3,917,342 | 11/1975 | Furuta | 297/385 |

FOREIGN PATENT DOCUMENTS 1384386 2/1975 United Kingdom .................... 280/744

Primary Examiner—Evon C. Blunk
Assistant Examiner—Michael J. Forman
Attorney, Agent, or Firm—Bacon & Thomas

[57] ABSTRACT

A flexible belt is fixed at its one end to one side of the vehicle seat and has at its other end a tongue member. An elongate rigid member is pivotally and rotatably fixed at its lower end to the other side of the vehicle seat and has at its upper end a buckle which releasably engages the tongue member.

5 Claims, 5 Drawing Figures

VEHICLE SEAT AND SAFETY SEAT BELT ASSEMBLY

The present invention relates in general to a vehicle seat and safety seat belt assembly, and more particularly to a safety seat belt assembly for restraining movement of a seated vehicle passenger.

It has been common that the attachment points for a safety seat belt are either on the components of the vehicle body (floor, sides, etc.) or directly on the seat. The attachment of the safety seat belt to the vehicle body is disadvantageous in that the length of the safety seat belt must be readjusted after each change in position of the vehicle seat. In order not to change the position of the safety seat belt in relation to the seated passenger while adjusting the position of the seat, the attachment directly to the seat has proved to be most suitable. This known attachment of the safety seat belt to the seat, more particularly to the seat frame or other rigid part of the seat brings about, however, the drawback that some parts constituting the safety seat belt inhibit the smooth ingress and egress of the passenger of the vehicle.

Accordingly, the present invention proposes to eliminate the above-mentioned drawback encountered in the conventional vehicle seat and safety seat belt assembly.

It is an object of the present invention to provide an arrangement in which a safety seat belt assembly does not inhibit the smooth ingress and egress of the vehicle passenger.

It is another object of the present invention to provide an arrangement in which a safety seat belt assembly is fixed to the corresponding vehicle seat to be movable therewith.

It is still another object of the present invention to provide an arrangement for use in a vehicle, comprising: a vehicle seat with a seat cushion portion and a back rest portion; and a safety seat belt assembly including a flexible belt having one end connected to a rigid member of the vehicle and the other end provided with first fastening means, the flexible belt being capable of crossing the vehicle seat, an elongate rigid member connected at one end thereof to one side of the seat cushion portion and having at the other end thereof second fastening means which is engageable with the first fastening means to embrace a seated passenger, pivotal means disposed between the one end of the elongate rigid member and the one side of the seat cushion portion for universely pivotally supporting the elongate rigid member relative to the seat cushion portion, and biasing means cooperated with the pivotal means for biasing the elongate rigid member to tilt toward its dormant position in which the smooth ingress and egress of the passenger is obtained.

Other objects and advantages of the present invention will become more apparent from the following detailed description when taken in conjunction with the accompanied several drawings, in which.

Figure 1:
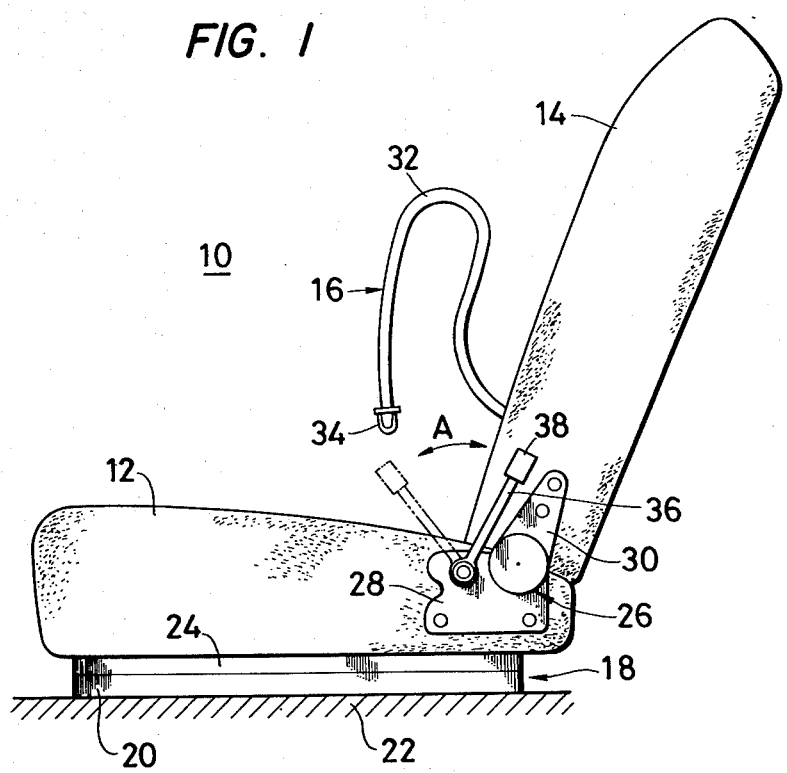
FIG. 1 is a side view of a vehicle seat and safety seat belt assembly according to the present invention, the assembly being shown as having an elongate swingable belt fastening member incorporated with a conventional back rest tilting device.

Referring now to FIG. 1 of the drawings, there is illustrated a vehicle seat and safety seat belt assembly 10 which generally comprises a seat cushion portion 12, a back rest portion 14 and a safety seat belt assembly 16. The seat cushion portion 12 is carried by a conventional fore-and-aft seat position adjuster 18 constituted of guide rails 20 mounted on the floor 22 of the vehicle and sliding members 24 connected to the seat cushion portion 12, the sliding members 24 being slidable on the guide rails 20.

The back rest portion 14 is stepwisely tiltable relative to the seat cushion portion 12 by means of a conventional back rest tilting device 26. The tilting device 26 herein shown generally includes a rigid base plate 28 secured to one side of the seat cushion portion 12, and an arm plate 30 arranged tiltable relative to the rigid base plate 28 and secured to one side of the back rest portion 14.

The safety seat belt assembly 16 generally comprises a flexible belt 32 having one end connected through a conventional belt retractor (not shown) to the other side of the seat cushion portion 12 and the free end equipped with a tongue member 34, and an elongate rigid member 36 having one end pivotally connected through later-mentioned pivotal means to the rigid base plate 28 and the other end equipped with a buckle 38 which releasably engages the above-mentioned tongue member 34.

Figure 2:
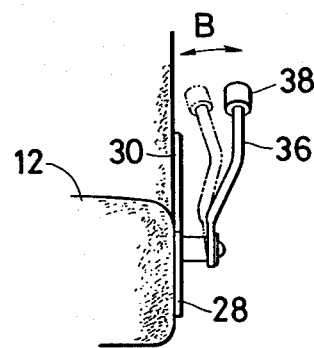
FIG. 2 is a partial frontal view of the vehicle seat and safety belt assembly of the present invention.
Figure 3:
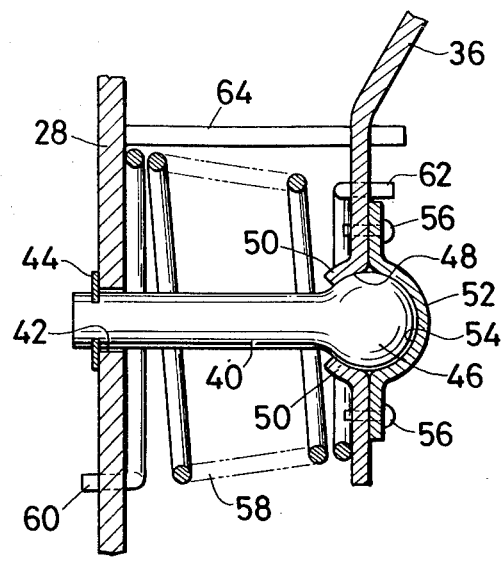
FIG. 3 is an enlarged sectional view of a main portion of the vehicle seat and safety seat belt assembly of the present invention, the main portion being shown as including pivotal means and biasing means.
Figure 5:
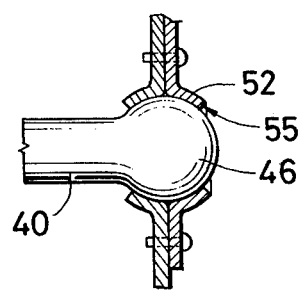
FIG. 5 is a partial sectional view of the pivotal means which is slightly modified.

FIG. 3 shows a detailed construction of the pivotal means for pivotally supporting the elongate rigid member 36 relative to the rigid base plate 28. The pivotal means comprises a shaft 40 which has one end firmly disposed in a through hole 42, formed in the rigid base plate 28, and locked thereto by a fastener 44. As shown, the shaft 40 is formed at the other end thereof with a ball-shaped head portion 46 which is rotatably disposed in a hole 48 formed in the lower portion of the elongate rigid member 36, the hole 48 being provided about the periphery thereof with a retaining lip 50. A cover plate 52 having a hemispherical recess 54 is connected to the lower portion of the elongate rigid member 36 to cover the hole 48 in such a manner that the ball-shaped head portion 46 of the shaft 40 is rotatably received in the hemispherical recess 54. If desired, the cover plate 52 may be formed at its central portion with an opening 55 as shown in FIG. 5. Some setscrews 56 are used for obtaining tight connection between the cover plate 52 and the lower portion of the elongate rigid member 36. As a result, the ball-shaped head portion 46, the lower portion of the elongate rigid member 36 and the cover plate 52 constitute a so-called ball-joint. Thus, it will be appreciated that the elongate rigid member 36 can universely swing or rotate about the ball-shaped head portion 46 of the shaft 40 in a way indicated by the arrows "A" and "B" viewed in FIGS. 1 and 2, respectively.

Figure 4:
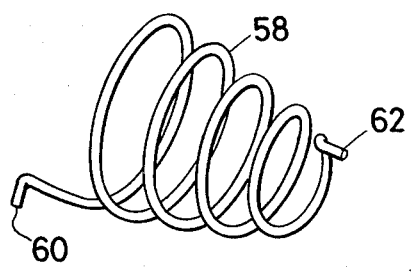
FIG. 4 is a perspective view of a spring which is used as the above-mentioned biasing means.

A spring 58 is disposed about the shaft 40 between the rigid base plate 28 and the lower portion of the elongate rigid member 36 for biasing the elongate rigid member 36 backwardly and rightwardly of the drawing of FIG. 3. This means that the elongate rigid member 36 illustrated in FIG. 1 is biased in the clockwise direction and the member 36 shown in FIG. 2 is biased in the rightward direction. Designated by the reference numerals 60 and 62 in FIG. 3 are respective ends of the spring 58 which are engaged to the rigid base plate 28 and the lower portion of the elongate rigid member 36, respectively. The detailed construction of the spring 58 is shown in FIG. 4.

A stop lever 64 is firmly fixed to the rigid base plate 28 in order to stop excessive movements of the elongate rigid member 36 by the extending end portion thereof allowing the elongate rigid member 36 to take its dormant position. Although not well shown, the leading end portion of the stop lever 64 is bent frontward of the drawing (FIG. 3) to limit the clockwise rotation of the elongate rigid member 36. The dormant position of the elongate rigid member 36 is a position in which the smooth ingress and egress of the vehicle passenger are not obstructed by such member 36. Preferably, the elongate rigid member 36 is maintained in its dormant position such that the longitudinal axis of the elongate rigid member 36 is substantially parallel to a plane of the front surface of the back rest portion 14 in its usually set position.

When it is desired to utilize the safety seat belt assembly of this invention, the vehicle passenger sitting on the seat grasps the buckle 38 of the elongate rigid member 36 with his left hand and rotates it forwardly and inwardly against the force of the spring 58 by a desired angle. Then, he pulls out the flexible belt 32 from the belt retractor with his right hand for latching the tongue member 34 of the flexible belt 32 to the buckle 38 to accomplish the operative condition of the safety seat belt assembly. Under this operative condition, the complicated movements of the flexible belt 32 caused by the movements of the seated passenger induce various rotation mode of the elongate rigid member 36 about the ball-shaped head portion 46 of the shaft 40.

When it is desired to terminate utilization of the safety seat belt assembly of the invention, the vehicle passenger unlatches the tongue member 34 from the buckle 38. Thus, the elongate rigid member 36 with the buckle 38 is returned to the dormant position by the urging force of the spring 58, and simultaneously, the flexible belt 32 is retracted into the belt retractor in a conventional manner.

From the above, it will be noted that the vehicle seat and safety seat belt assembly according to the present invention has an operative condition wherein it will function to restrain a vehicle passenger against abnormal movement in a manner identical to a conventional safety seat belt assembly and an inoperative condition wherein the parts of the safety seat belt assembly do not obstruct the smooth ingress and egress of the passenger of the vehicle.

The herein presented detailed description of the preferred embodiment of the present invention is for the purpose of explaining the principles thereof only, and is not to be considered as limiting or restricting the present invention, since many modifications may be made by exercise of skill in the art without departing from the scope of the present invention.

What is claimed is:

1. A safety seatbelt assembly for a vehicle having a seat comprising a seat cushion portion and a backrest portion which is mounted on a rear portion of said seat cushion portion, said safety seatbelt assembly comprising:
   (a) a flexible seatbelt having one end thereof firmly connected to one side of said seat cushion portion and the other end thereof equipped with first fastening means, said seatbelt being capable of crossing said seat to restrain a vehicle passenger sitting thereon;
   (b) an elongated shaft secured at its one end to the other side of said seat cushion portion at a location adjacent said rear portion of said seat cushion portion and formed at its leading end with a ball-shaped head portion;
   (c) an elongated rigid member having a lower portion which is formed with a flanged opening into which said ball-shaped head portion is rotatably received, said elongated rigid member having at its upper end a second fastening means which is engagable with said first fastening means to permit said seatbelt to restrain a vehicle passenger;
   (d) a cover plate having a hemispherical recess formed therein which faces said flanged opening, said cover plate being secured to said elongated rigid member such that said elongated rigid member is universally rotatably supported on said ball-shaped head portion by said flanged opening and said hemispherical recess;
   (e) a coil spring disposed about said elongated shaft having one end thereof engaging said seat cushion portion and the other end thereof engaging said elongate rigid member so as to simultaneously bias said elongate rigid member to rotate about said ball-shaped head portion toward a dormant position in which a longitudinal axis of the elongate rigid member is substantially parallel to a plane defined by a front surface of said backrest portion, and in a direction away from said seat cushion portion; and
   (f) a stop member mounted on said seat cushion portion which engages said elongate rigid member to prevent the excessive rotation thereof.

2. A safety seat belt assembly for a seat which includes a seat cushion portion and a backrest portion mounted on said seat cushion portion, said safety seat belt assembly comprising:
   (a) a flexible seat belt having one end thereof mounted on one side of said seat and the other end thereof equipped with a first fastening member, said seat belt being capable of crossing said seat to restrain a passenger sitting thereon;
   (b) an elongated rigid member positioned on the other side of said seat, having at its upper end a second fastening member which is engageable with said first fastening member for restraining a passenger in said seat;
   (c) an elongated shaft having one end secured to a lateral side of said seat cushion portion on the side opposite to which said flexible seat belt is attached, and the other end having a ball-shaped head portion;
   (d) a socket portion comprising a hemispherically flanged hole integrally formed on a lower end of said elongated rigid member into which said ball-shaped head of said elongated shaft is rotatably received, and a cover plate having a hemispherical recess formed therein which faces said flanged hole, said cover plate being secured to said elongated rigid member such that said elongated rigid member is universally rotatably supported on said ball-shaped head by said flanged hole and hemispherical recess, and is rotatable from a dormant position, in which a longitudinal axis of said elongated rigid member is substantially parallel to a plane defined by the front surface of said seat backrest portion and is rotated in a direction away from said seat cushion portion, to a forward position; and, (e) a coil spring disposed about said elongated shaft with one end thereof engaging said lateral side of said seat cushion portion, and the other end thereof engaging said elongated rigid member at its lower end so that said elongated rigid member is biased in said dormant position.

3. The seat belt assembly of claim 2, wherein said forward position comprises a position in which the longitudinal axis of said elongated rigid member intersects the dihedral angle formed between an upper surface of said seat cushion portion and the front surface of said backrest portion.

4. The seat belt assembly of claim 2, further comprising a stop member mounted on the lateral side of said seat cushion portion which engages said elongated rigid member to prevent the excessive rotation thereof.

5. The seat belt assembly of claim 2, wherein said cover plate has an opening formed in said hemispherical recess.

* * * * *